United States Patent [19]
Synesiou et al.

[11] Patent Number: 5,959,549
[45] Date of Patent: Sep. 28, 1999

[54] COMMUNAL METERING SYSTEM

[75] Inventors: Andreas Joanni Synesiou; John Andrew Synesiou, both of Bedfordview, South Africa

[73] Assignee: Sinesonics Limited, Edenvale, South Africa

[21] Appl. No.: 08/709,580

[22] Filed: Sep. 9, 1996

[30] Foreign Application Priority Data

Sep. 8, 1995 [ZA] South Africa .......................... 95/7562

[51] Int. Cl.⁶ ................................................ G08B 23/00
[52] U.S. Cl. ............................ 340/870.02; 340/870.03; 364/528.21
[58] Field of Search ................... 340/870.02, 870.03; 384/528.21; 324/116, 142; 205/412

[56] References Cited

U.S. PATENT DOCUMENTS

| | | | |
|---|---|---|---|
| 4,351,028 | 9/1982 | Peddie | 364/528.21 |
| 4,731,575 | 3/1988 | Sloan | 324/113 |
| 4,803,632 | 2/1989 | Frew | 340/870.02 |
| 4,804,957 | 2/1989 | Selph | 340/870.03 |
| 4,924,404 | 5/1990 | Reinke, Jr. . | |
| 4,933,633 | 6/1990 | Allgood | 324/142 |
| 5,699,276 | 12/1997 | Roos | 364/514 A |

FOREIGN PATENT DOCUMENTS 0602676 6/1994 European Pat. Off. .
9324842 12/1993 WIPO .

*Primary Examiner*—Michael Horabik
*Assistant Examiner*—Albert K. Wong
*Attorney, Agent, or Firm*—Fulbright & Jaworski, LLP

[57] ABSTRACT

A communal electricity metering system supplies electricity to consumer sites via metering sites which each comprise a number of separate metering and meaurement devices, and a common control unit. The control unit stores credit data for each consumer site, and monitors the consumption of electricity at each site, interrupting the supply when the respective credit is exhausted. Display units at the consumer sites communicate with the control unit, which transmits status data to each display unit. In addition, a consumer can use the display unit to communicate with a central control station via the control circuit at the metering site, via a combination of mains-borne and radio communication, to purchase additional credits and to receive confirmation of the entering of such credits at the metering site.

16 Claims, 5 Drawing Sheets

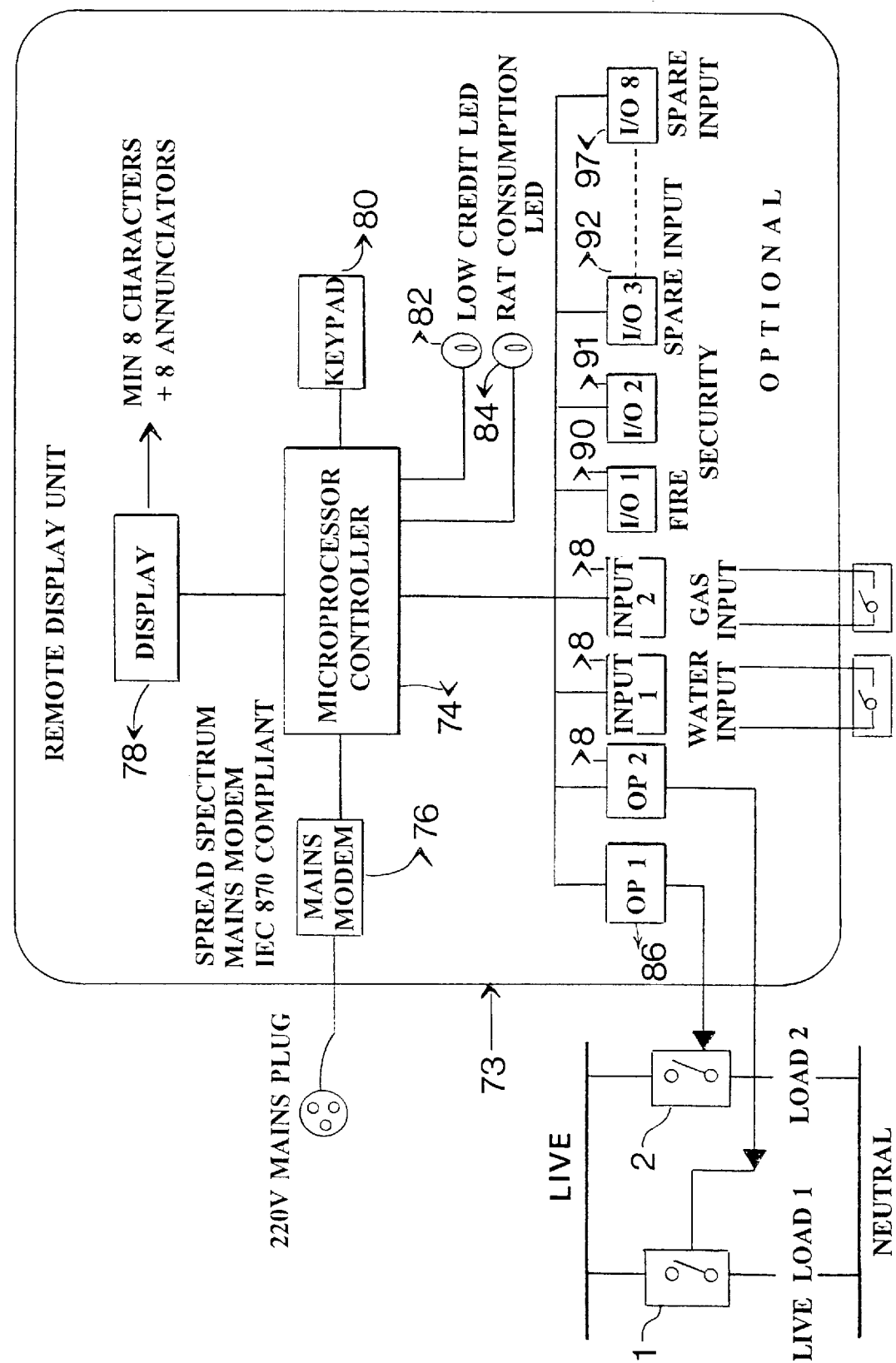

FIG 6

| Item | Display Options | Units | Mode |
|---|---|---|---|
| 1 | Total Units used to date (Elec) | kWh | Pre/Billing |
| 2 | Available Credit (Elec) | kWh | Pre/Billing |
| 3 | Available Credit (Elec) | R | Pre/Billing |
| 4 | Present Consumption Rate (Elec) | kWh | Pre/Billing |
| 5 | Last Amount Purchased (Elec) | kWh | Pre/Billing |
| 6 | Last Billing Date | | |
| 7 | Last Billed Amount (Elec) | kWh | Pre/Billing |
| 8 | Contactor Status | | |
| 9 | Time remaining (Elec) | hh:mm:ss | Optional |

COMMUNAL METERING SYSTEM

BACKGROUND OF THE INVENTION

THIS invention relates to a method of controlling the use of a utility and to a system for implementing the method.

The use of electricity dispensing units (EDU's), particularly of the prepayment variety, has become widespread. In a typical installation, such an EDU is installed at a consumer's premises and contains circuitry for measuring the consumption of electricity, a processor circuit for storing credit information and comparing the credit information with the electricity consumed, and a circuit breaker or other switching device for disconnecting the electricity supply when the credit is used up. The EDU will also include a keypad, card reader or the like for allowing a user to input the credit information, and some form of display for indicating the status of the unit.

Since the field of application of EDU's is generally in low cost housing, it is desirable to reduce the cost of each unit as far as possible. It is also desirable to reduce the ease with which the system can be tampered with. This makes it desirable to carry out at least some of the functions of a conventional EDU at a site remote from the consumer's premises.

It is an object of the invention to provide a method and system for controlling the use of a utility of the latter kind.

SUMMARY OF THE INVENTION

According to the invention a method of controlling the use of a utility at a consumer site comprises:

supplying the utility to the consumer site via metering means located at a metering site remote from the consumer site;

monitoring, at the metering site, consumption of the utility at the consumer site;

generating display data at the metering site corresponding to the consumption of the utility;

transmitting the display data to display means at the consumer site; and generating a display at the consumer site from the display data, indicative of the consumption of the utility.

Preferably, consumption of the utility at a plurality of consumer sites is measured by respective separate measurement modules located at the metering site.

The consumption data generated by the respective measurement modules may be output to a common control circuit which generates the display data for transmission to the display means at respective consumer sites.

The display data may be transmitted via electrical supply cables running between the metering site and the consumer sites.

The method preferably includes storing credit data for each consumer site at the metering site, reducing the value of a credit represented by the data in accordance with consumption of the utility at each consumer site, and operating the respective metering means to interrupt the supply of the utility to each consumer site when the credit value reaches a predetermined value The credit data may be generated at a control centre and transmitted to the metering site.

Preferably, the credit data is transmitted to respective ones of a plurality of metering sites from the control centre via wireless radio transmission and/or electrical supply cables.

The method may include transmitting enquiry data from display means at the consumer site to the metering means at the metering site.

The enquiry data may comprise a status request made by a consumer to the metering means, the metering means transmitting display data and transmitting it to the display means in response to the status request Alternatively, or in addition, the enquiry data may comprise a credit request made by a consumer to a utility supplier, the credit request data being transmitted via the metering means to a central control centre, a further credit being allocated to the consumer at the control centre, and new credit data being transmitted from the control centre to the metering site Further according to the invention a system for controlling the use of a utility at a consumer site comprises:

metering means located at a metering site remote from at least one consumer site and arranged to control the supply of a utility to the at least one consumer site;

monitoring means located at the metering site arranged to monitor the consumption of the utility at the consumer site and to generate display data corresponding to the consumption of the utility;

first communication means for transmitting the display data to the consumer site; and display means located at the consumer site and responsive to the display data to generate a display indicative of the consumption of the utility.

The monitoring means may comprise a plurality of separate measurement modules and a common control circuit which receives utility consumption data from each measurement module and outputs control signals thereto.

The control circuit may include data storage means for storing data corresponding to respective consumers, including at least identification data, credit data corresponding to a current credit value, and utility consumption data; and processor means for calculating a current credit value from a previous credit value and the utility consumption data.

The display means may comprise second communication means for receiving a signal containing the display data from the first communication means, processor means for extracting the display data from the received signal, and a display module for displaying the display data in a discernible form.

Preferably, the display means includes data input means connected to the processor means and operable by a user thereof to input enquiry data comprising a status request, the second communication means being adapted to transmit the enquiry data to the first communication means of the monitoring means, and the monitoring means being responsive to the enquiry data to transmit display data to the display means.

The first communication means is preferably further adapted to receive enquiry data comprising a credit request from the display means, to transmit the enquiry data to a control centre, to receive new credit data from the control centre, and to store a new credit value corresponding to the new credit data.

Alternatively, or in addition, the first communication means may be further adapted to transmit the new credit data to the display means.

In a preferred embodiment of the invention, the first and second communication means comprise mains modems which communicate via electrical supply cables running between the metering station and the consumer sites.

BRIEF DESCRIPTION OF THE DRAWINGS

FIG. 5 is a block schematic diagram showing the circuitry of the remote display unit; and FIG. 6 is a table showing the display options provided by the remote display unit

DESCRIPTION OF AN EMBODIMENT

Figure 1:
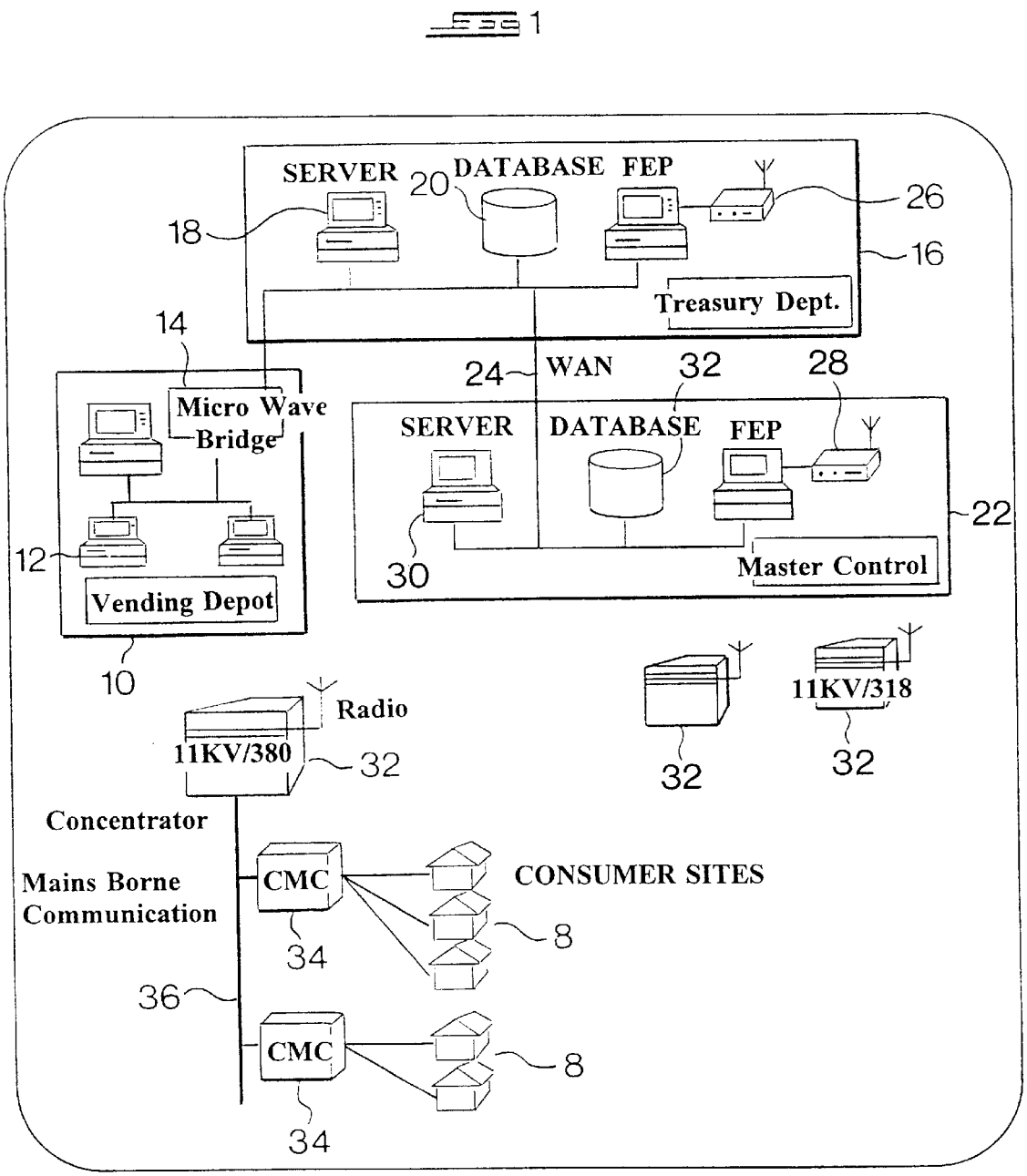
FIG. 1 is a general schematic illustration of a typical utility dispensing system according to the invention, adapted to control the delivery of electricity to consumers.

FIG. 1 is an overall schematic illustration of a system for controlling the use of electricity by consumers. Although the embodiment described below relates primarily to the supply and control of electricity to consumers, it will be appreciated that other utilities such as gas or water, or even access to radio or television broadcasts can be controlled by the system of the invention. Thus, the word "utility" should be interpreted in a broad sense in this specification as meaning a substance such as gas or water, energy such as electricity, information or data as in the case of a television or music program signal, or another commodity or service which is supplied in a controlled manner to a user thereof.

In FIG. 1, a vending depot 10 is shown comprising a number of computer terminals 12 connected in a network configuration. The vending depot serves to receive payment from consumers wishing to purchase electricity (or other utilities) and generates credit information which is transmitted via communications means 14 (in the prototype system, a microwave link) to a treasury department 16.

The treasury department includes a computer network with a number of terminals 18 and a database 20 in which transaction details for each consumer are stored.

The system includes a master control centre 22 which is connected to the vending depot 10 and the treasury department 16 in a wide area network (WAN), typically via a microwave link 24, and preferably also via a backup radio link, comprising transceivers 26 and 28.

The master control centre 22 communicates via the radio transceiver 28 with a similar radio unit at each of several concentrators 32 which are typically located at electricity substations which supply a predetermined area with electricity. The concentrator collects information from each of a plurality of communal metering controllers or CMC's 34 (described below) which are connected to the substation via a mains electricity cable 36 and which communicate with the concentrator via power line modems.

In a typical system, each substation might supply electricity to approximately 100 households or consumer sites. Connected to each substation and its respective concentrator would typically be seven communal metering controllers 34, each of which can control the supply of electricity to up to 20 households or other consumer sites 8.

Figure 2:
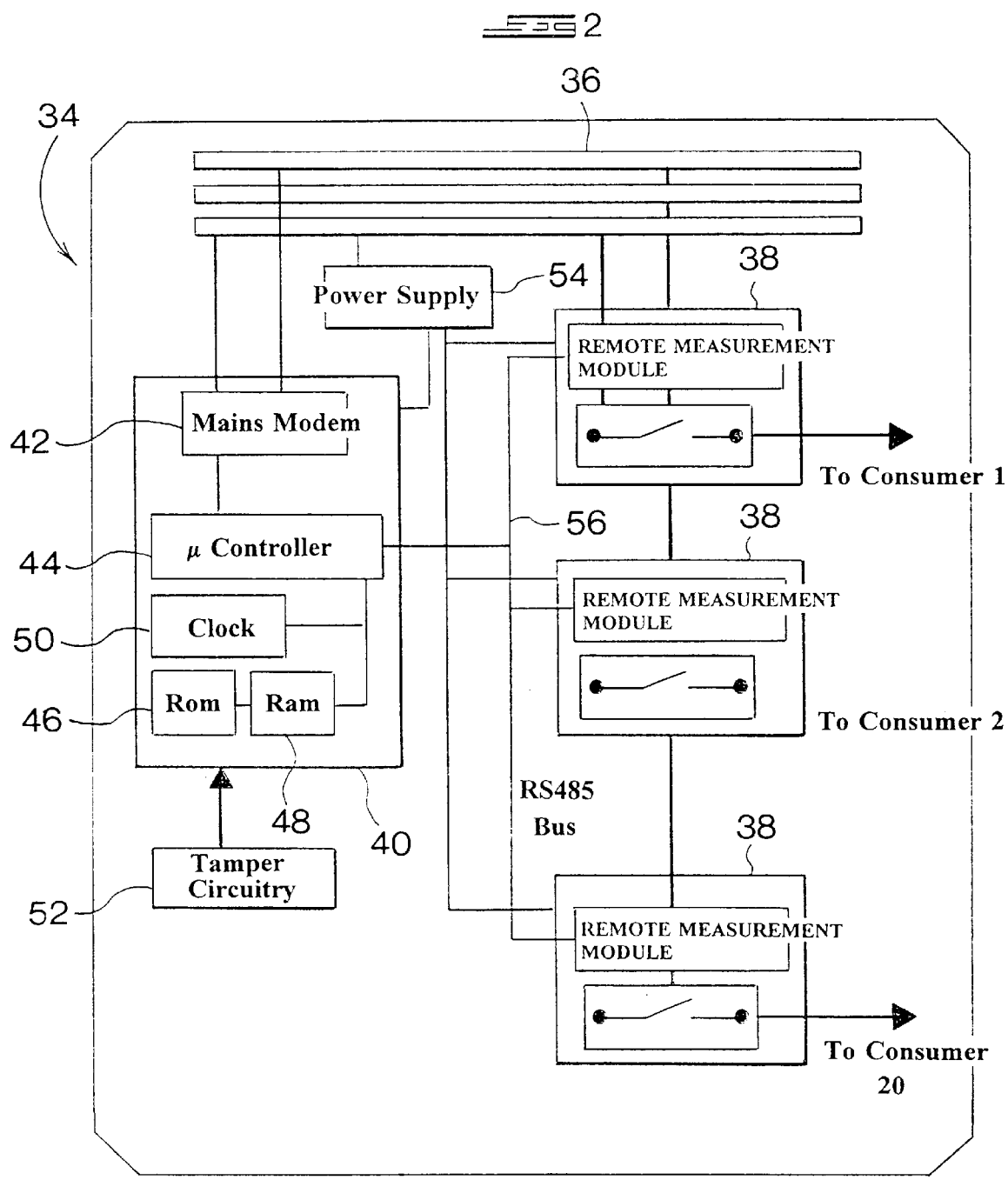
FIG. 2 is a block schematic diagram of a communal metering controller according to the invention.

Referring now to FIG. 2, a single communal metering controller 34 is shown in more detail. Each controller 34 contains a plurality of remote measurement modules 38 (each of which is shown in greater detail in FIG. 3), and a control circuit 40 which operates together with the remote measurement modules 38 to control the supply of electricity to each consumer site 8 (up to a maximum of 32).

The control circuit or controller 40 includes a mains modem 42, a microcontroller or microprocessor 44 with associated ROM 46 and RAM 48 and a system clock 50. The controller also includes tamper detection circuitry 52. Both the controller 40 and the remote measurement modules are fed with a 12 volt DC supply from a power supply circuit 54, and communicate via an RS 485 bus 56.

Figure 3:
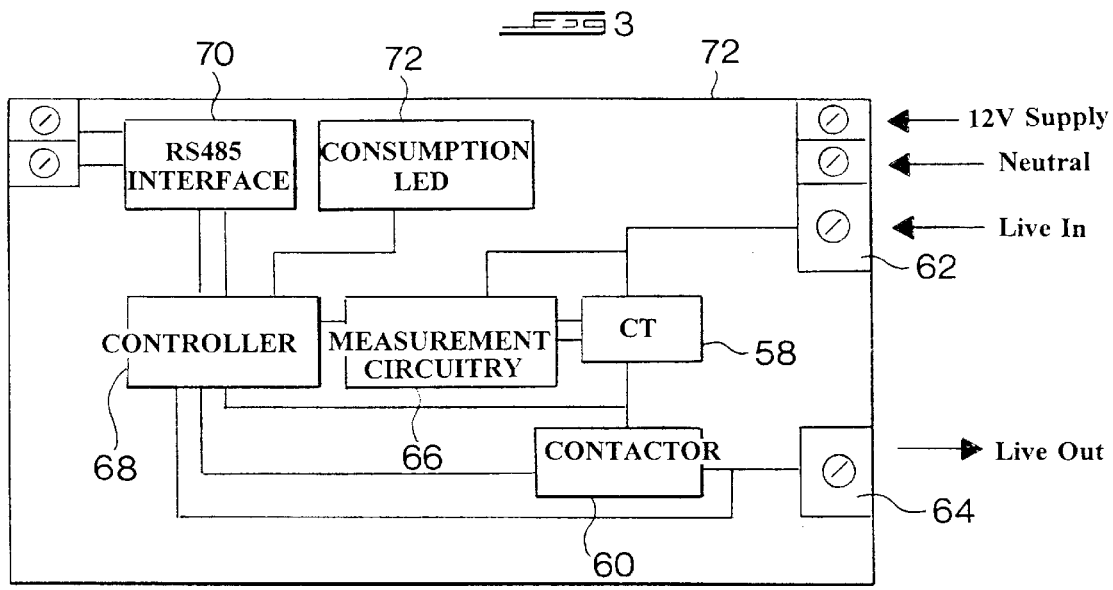
FIG. 3 is a block schematic diagram of a single remote measurement module of the controller of FIG. 2.

As best seen in FIG. 3, each remote measurement module 38 comprises a current transformer 58 and a contactor 60 arranged in series with a "live in" terminal 62 and a "live out" terminal 64. The secondary of the current transformer 58 is connected to a power/current measurement circuit 66 which is in turn connected to a microcontroller 68. The microcontroller is connected to an RS 485 interface circuit 70 to allow communication with the controller 40. A local LED indicator 72 is connected to the microcontroller 68 to allow monitoring of current consumption.

The current transformer measures the electricity current consumption of the household or consumer site supplied by the particular remote measurement module 38, with the electrical supply cable to the relevant site being connected via the respective module. The measurement circuit 66 measures the current and the voltage for each individual consumer, calculates the power consumption and passes the relevant data to the microcontroller 68, which in turn passes the data via the RS 485 interface 70 to the communal metering controller 34.

The microcontroller 68 also outputs pulses to the local LED 72. The frequency of the output pulses to the LED is proportional to the power being used by the consumer. This LED 72 is used to calibrate the meter for accuracy as well as to give an indication that the measuring circuits are in good working order. All the relevant data concerning the remote measuring module 38 are stored locally in an EEPROM.

The locally stored data includes as a minimum the following:

1. A unique identification number as well as a module address.

2. Consumption data for electricity, water and gas.

3. Data of installation and whether the meter has been replaced since initial installation.

4. Tamper information which includes tamper information from the remote display unit.

5. Connect/disconnect information.

6. Information as to whether the internal contactor has been by-passed i.e. the consumer circuits are live but the internal contactor is open (the supply is disconnected).

7. A security algorithm to ensure secure communications as well as error detection and correction.

The microcontroller 68 stores a unique identification number and a module address code, allowing the consumption data derived from a particular consumer site to be related to that site and to the credit data corresponding thereto.

The control circuit 40 of each communal metering controller 34 monitors the consumption information output by the microcontroller 68 of the remote measurement modules 38, and compares this data with the credit data corresponding to each consumer site which has been received from the master control centre 22 via the concentrator 32. When the credit corresponding to a particular consumer site is exhausted, the controller 40 sends a command signal to the respective remote measurement module 38, the microcontroller 68 of which operates the contactor 60 to disconnect the electricity supply to that consumer site. This command signal can be generated locally as described above, or can be generated at the master control centre 22, and can be generated manually instead of automatically.

Each communal metering controller is located in a housing which is remote from the consumer sites or households which it supplies. For example, the housing could be mounted at the top of an electricity supply pole, in a building such as a substation, or in a purpose-built enclosure. In any event, all of the measurement and control circuitry required to supply electricity to the consumer site is centralised so that it is only necessary for a supply cable to run from the communal metering controller to each consumer site. The circuit breaker or contactor which controls the electricity supply to each consumer site is also located together with the measurement circuitry, so that it is not accessible to the consumer. This reduces the possibility of tampering with the electricity supply.

Figure 4:
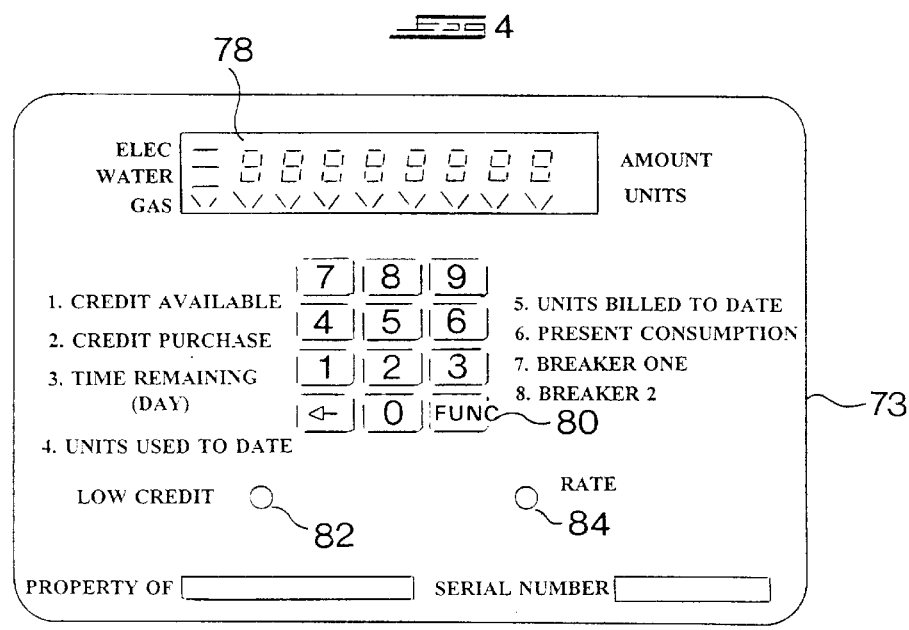
FIG. 4 is a schematic illustration of the control panel of a remote display unit forming part of the system.

At each consumer site is a remote display unit 73. The front panel of the display unit is illustrated schematically in FIG. 4, while the circuitry thereof is illustrated schematically in FIG. 5. The remote display unit has a microprocessor controller 74 connected to a mains modem 76 which is arranged to be plugged into the mains electrical supply at the consumer site and which allows communication between the remote display unit and the communal metering controller 34 which controls the supply of electricity to that consumer site, via the mains modem 42.

The remote display unit also has a display 78 which is typically an LCD or LED display with at least eight characters and eight annunciator symbols.

The display unit also has a keypad 80 to allow data input by the consumer and a pair of LED's 82 and 84, the first of which is illuminated to show a "low credit" condition, and the second flashing to indicate the rate of electricity consumption.

The mains modem 76 of the remote display unit communicates with the communal metering controller 34 using spread spectrum communication techniques in the 20 to 90 kHz band, or 100 kHz to 400 kHz, for example, depending on local regulations.

As shown in FIG. 6, selecting various display options using the keypad allows the user to display the available credit, both in electricity units or in monetary terms, the total amount of electricity used to date, the present rate of electricity consumption and a number of other variables. In addition, the provision of a keypad 80, together with the communication function provided by the microprocessor 74 and the modem 76 allows the remote display unit 73 to be used as a communication terminal by the consumer.

Thus, the display unit is not limited to displaying status information transmitted by the controller 40 of the communal metering controller 34, but can be used by the consumer to communicate with the master control centre 22, for example. This feature can be used to allow the consumer to make payments to the utility supplier. A secret code or PIN can be allocated to the consumer, who can then initiate communication with the master control centre, enter the PIN, enter a credit card number, and then indicate the amount of credit which he or she wishes to purchase for that particular utility. Alternatively, the consumer can have an account with the utility supplier which is adjusted when a credit is purchased and which is paid conventionally. In either case, when an additional credit is purchased, new credit data is generated by the utility supplier and transmitted back from the master control centre to the relevant controller 40, and from there to the relevant display unit 73, either directly or in response to an enquiry.

The microprocessor 74 of the remote display unit 73 is configured to have two output circuits 86 and 87 which independently control external circuit breakers 1 and 2 respectively. The circuit breakers 1 and 2 are used to switch on and off non-essential loads to reduce maximum demand i.e. load control or load shedding. This function gives the utility company the means to make more efficient use of their generating plant and also enables them to reduce costs.

The microprocessor 74 is also configured to have two inputs 88 and 89. Input 88 is used to monitor water consumption and input 89 to monitor gas consumption. Both inputs 88 and 89 monitor the circuits connected to them to ensure that the entire system is healthy and in fully operational condition. If the monitored circuits become defective in any way, the microprocessor 74 immediately sends an alarm to the communal metering controller 34 via the mains modems 76 and 42. From the communal metering controller 34, the alarm is sent to the concentrator 32 and finally to the master controller 22. The alarms are annunciated at all places and at all stages of the system.

The consumption data for both water and gas is processed in the microprocessor 74 and then sent to the communal metering controller 34, which in turn sends this data to the concentrator 32, which then finally sends it to the master controller 22.

In addition to the above, the remote display unit 73 has the functional facility to be equipped with another 8 input/outputs, one of which can be used for a fire alarm 90. Another can be used for a security alarm 91 and the remainder, 92 to 97, can be customised to meet the needs of the consumer. e.g. for household automation.

It will be appreciated that the use of the use of the remote display unit 73 is not essential to the basic operation of the utility control system, since the actual control and measurement function is carried out remotely from the consumer site, by the communal metering controllers 34. However, the provision of the remote display unit allows the consumer to obtain information as to the status of the utility supply, and also allows communication with the utility supplier. Such communication is particularly advantageous when used to allow the consumer to purchase credit for further supplies of the utility. The remote display unit can be installed anywhere at the consumer site, since it has no direct physical link to the communal metering controller 34, but communicates instead via the mains supply into which it is plugged.

We claim:

1. A method of controlling the use of a utility at a plurality of consumer sites comprising:

supplying the utility to each of said plurality of consumer sites via metering means located at a metering site remote from the consumer sites;

monitoring, at the metering site, consumption of the utility at each consumer site by means of a plurality of respective separate measurement modules;

generating consumption data at the metering site corresponding to the consumption of the utility at each consumer site;

outputting said consumption data from each measurement module to a common control circuit at the metering site which generates display data for transmission to display means at each consumer site;

transmitting the display data to said display at each consumer site; and generating a display at each consumer site from the display data, indicative of the consumption of the utility at that consumer site.

2. A method according to claim 1, wherein the display data is transmitted via electrical supply cables running between the metering site and the consumer sites.

3. A method according to claim 1, including storing credit data for each consumer site at the metering site, reducing the value of a credit represented by the data in accordance with consumption of the utility at each consumer site, and operating the respective metering means to interrupt the supply of the utility to each consumer site when the credit value reaches a predetermined value.

4. A method according to claim 3 wherein the credit data is generated at a control centre and transmitted to the metering site.

5. A method according to claim 4, wherein the credit data is transmitted to respective ones of a plurality of metering sites from the control centre via wireless radio transmission and/or electrical supply cables.

6. A method according to claim 1, including transmitting enquiry data from display means at the consumer site to the control circuit at the metering site.

7. A method according to claim 6, wherein the enquiry data comprises a status request made by a consumer to the control circuit, the control circuit generating display data and transmitting it to the display means in response to the status request.

8. A method according to claim 6, wherein the enquiry data comprises a credit request made by a consumer to a utility supplier, the credit request data being transmitted via the control circuit to a central control centre, a further credit being allocated to the consumer at the control centre, and new credit data being transmitted from the control centre to the metering site.

9. A system for controlling the use of a utility at a plurality of consumer sites comprising:

metering means located at a metering site remote from said plurality of consumer sites and arranged to control the supply of a utility to each consumer site;

monitoring means comprising a plurality of separate measurement modules located at the metering site and arranged to monitor the consumption of the utility at each respective consumer site and to generate consumption data corresponding to the consumption of the utility at each consumer site;

a common control circuit which receives the consumption data from each measurement module and generates display data therefrom for transmission to display means at each consumer site; and display means located at each consumer site and responsive to the display data to generate a display indicative of the consumption of the utility at that consumer site.

10. A system according to claim 9, wherein the common control circuit includes data storage means for storing data corresponding to respective consumers, including at least identification data, credit data corresponding to a current credit value, and utility consumption data; and processor means for calculating a current credit value from a previous credit value and the utility consumption data.

11. A system according to claim 9, wherein the display means at each consumer site comprises second communication means for receiving a signal containing second communication means for receiving a signal containing the display data from the first communication means, processor means for extracting the display data from the received signal, and a display module for displaying the display data in a discernible form.

12. A system according to claim 9, wherein the display means includes data input means connected to the processor means and operable by a user thereof to input enquiry data comprising a status request, the second communication means being adapted to transmit the enquiry data to the first communication means of the common control circuit, and the common control circuit being responsive to the enquiry data to transmit corresponding display data to the display means.

13. A system according to claim 12, wherein the common control circuit is arranged to receive enquiry data comprising a credit request from the display means via the first communication means, to transmit the enquiry data to a control centre, to receive new credit data from the control centre, and to store a new credit value corresponding to the new credit data.

14. A system according to claim 13, wherein the common control circuit is further adapted to transmit the new credit data to the display means via the first communication means.

15. A system according to claim 11, wherein the first and second communication means comprise mains modems which communicate via electrical supply cables running between the metering site and the consumer sites.

16. A system according to claim 9, wherein the common control circuit includes first communication means for transmitting the display data to each consumer site.

* * * * *